(12) United States Patent
Horvitz et al.

(10) Patent No.: US 8,805,010 B2
(45) Date of Patent: Aug. 12, 2014

(54) GESTURE IDENTIFICATION USING AN AD-HOC MULTIDEVICE NETWORK

(75) Inventors: Eric Horvitz, Kirkland, WA (US); Kenneth P. Hinckley, Redmond, WA (US); Hrvoje Benko, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 13/352,487

(22) Filed: Jan. 18, 2012

(65) Prior Publication Data

US 2013/0182892 A1 Jul. 18, 2013

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| 7,609,644 B2 | 10/2009 | Tateson | |
| 2006/0265664 A1 | 11/2006 | Simons et al. | |
| 2007/0002783 A1 | 1/2007 | Krantz et al. | |
| 2007/0111735 A1 | 5/2007 | Srinivasan et al. | |
| 2007/0115358 A1* | 5/2007 | McCormack | 348/159 |
| 2009/0158220 A1 | 6/2009 | Zalewski et al. | |
| 2009/0201896 A1 | 8/2009 | Davis et al. | |
| 2009/0274137 A1 | 11/2009 | Hall et al. | |
| 2011/0093820 A1* | 4/2011 | Zhang et al. | 715/863 |
| 2011/0292036 A1* | 12/2011 | Sali et al. | 345/419 |

OTHER PUBLICATIONS

Zou, et al., "A Distributed Coverage- and Connectivity—Centric Technique for Selecting Active Nodes", In IEEE Transactions on Computers, vol. 54, Issue 8, Aug. 2005, 14 pages.

* cited by examiner

*Primary Examiner* — Atiba O Fitzpatrick
(74) *Attorney, Agent, or Firm* — Aaron Chatterjee; Leonard Smith; Micky Minhas

(57) ABSTRACT

Methods, systems, and computer-readable media for establishing an ad hoc network of devices that can be used to interpret gestures. Embodiments of the invention use a network of sensors with an ad hoc spatial configuration to observe physical objects in a performance area. The performance area may be a room or other area within range of the sensors. Initially, devices within the performance area, or with a view of the performance area, are indentified. Once identified, the sensors go through a discovery phase to locate devices within an area. Once the discovery phase is complete and the devices within the ad hoc network are located, the combined signals received from the devices may be used to interpret gestures made within the performance area.

18 Claims, 7 Drawing Sheets

GESTURE IDENTIFICATION USING AN AD-HOC MULTIDEVICE NETWORK

BACKGROUND

Users are able to communicate with some computing devices by making gestures that the computing device receives through a gesture interface. A gesture interface comprises one or more sensors that detect a user's gestures. Gestures may comprise one or more physical movements, such as holding a hand in a particular position or moving one or more body parts. Once identified, a computing device may perform actions in response to the gesture. For example, a computing device may adjust a sound level in response to a gesture associated with volume control.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the invention use a network of sensors with an ad hoc spatial configuration to observe physical objects in a performance area. The performance area may be a room or other area within range of the sensors. The sensors are communicatively coupled to one or more network devices. An ad hoc spatial configuration means that the devices in the network may not be initially aware of their location within the performance space.

Initially, devices within the performance area, or with a view of the performance area, are indentified. Once identified, the sensors go through a discovery phase to locate devices within an area. Once the discovery phase is complete and the devices within the ad hoc network are located, the combined signals received from the devices may be used to interpret gestures made within the performance area. In one embodiment, multiple devices are used to interpret a gesture made while not facing any of the sensors. In this case, the multiple signals may be woven together to project the gesture onto a virtual viewpoint that provides an analytical component with features or attributes of the gesture that allow it to be identified. For example, the analytical component may integrate and project the signals on a plane oriented in a manner that makes the gesture ideally interpretable. Such projections from multiple devices can be useful in regularizing or normalizing the signals associated with the gesture in a manner conforming to the expectations of a pattern recognition process (e.g., the training and testing of a statistical classifier for gesture recognition). In another embodiment, the best signal available is used to interpret the gesture. In this way, people can interact naturally within a performance environment without having to face a particular sensor.

In another embodiment, additional sensing devices are pursued incrementally when recognition problems are noted on a primary device or with a set of devices already being used to recognize gestures. For example, a primary device or current configuration can perform an analysis that reveals that the information available in a situation is insufficient to recognize the performance of one or more potential gestures. Similarly, the primary device or current configuration may determine that it is unable to differentiate between similar known gestures (or intention associated with a gesture) with sufficient confidence. Such an assessment of insufficiency can be employed to guide the acquisition of additional sensors. As an example, if the feed from a camera cannot be used to discriminate whether person A or person B is making a gesture with their hands and legs in a gaming setting, given a current end-on view of two people playing the game, then the system may seek access to accelerometers on the smart phones on one or both of the players via a WI-FI or Bluetooth connection. The primary device or configuration may use the accelerometer signal to augment its reasoning and raise the confidence of which of the two players is making the gesture.

Beyond heuristically extending the numbers of devices, to gain access to sensors that may be available via a network, a system can be designed to engage in an detailed analysis of the value information provided by additional sensors from other available devices would be to the ad hoc sensor network. Such an analysis of information value can direct the extension of the ad hoc network in a specific manner, e.g., to complete a view, by filling in the most valuable pieces of the deficiencies in the current ad hoc sensing network.

BRIEF DESCRIPTION OF THE DRAWINGS

Embodiments of the invention are described in detail below with reference to the attached drawing figures, wherein.

DETAILED DESCRIPTION

Figure 1:
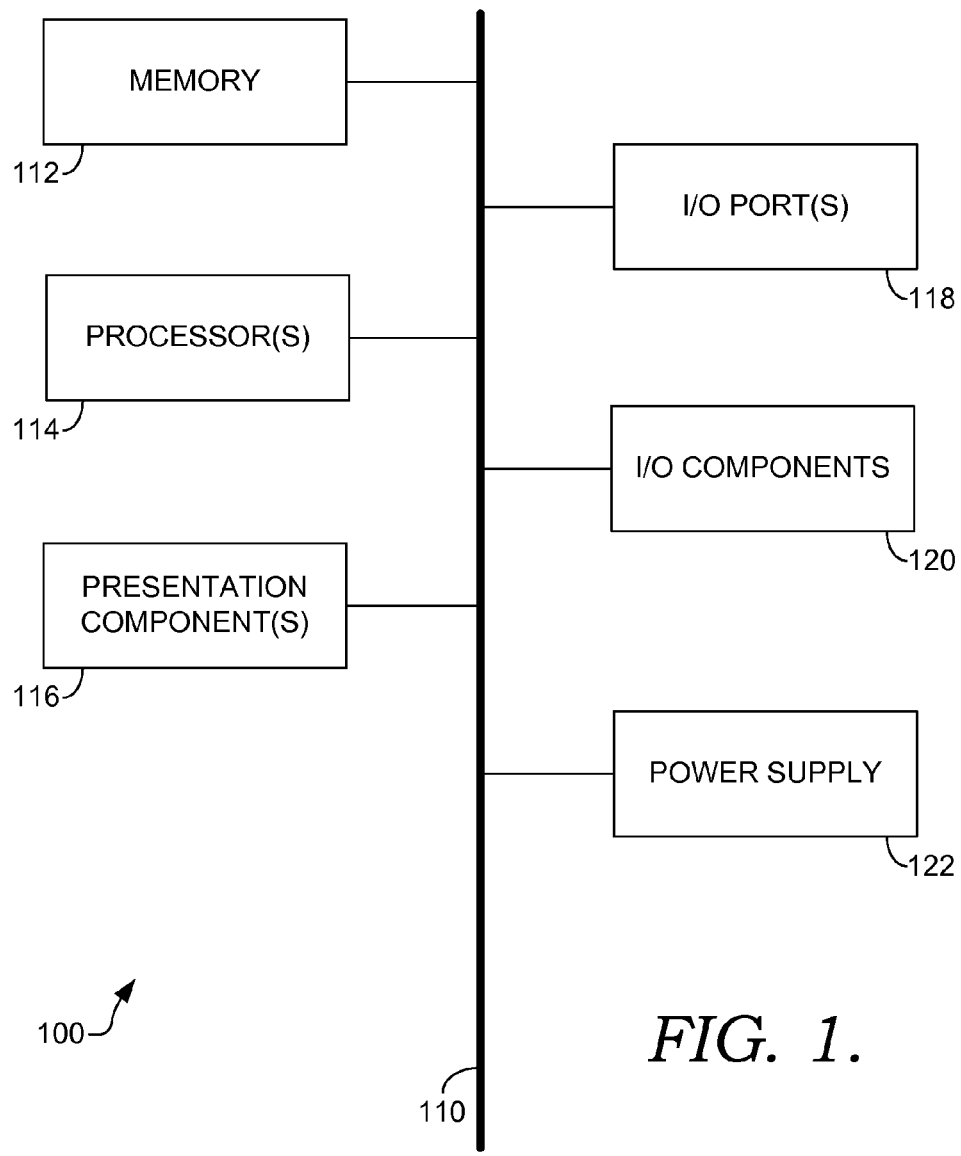
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention use a network of sensors with an ad hoc spatial configuration to observe physical objects in a performance area. The performance area may be a room or other area within range of the sensors. Exemplary sensors include a camera, a depth camera, a microphone, a speaker, a radio, a touch screen, and inertial sensors. An inertial sensing package may include a three-axis accelerometer, a three-axis gyroscope, a three-axis magnetometer, and sometimes a barometer (for sensing air pressure/elevation changes) as well. The sensors may be incorporated into a computing device or stand-alone. The sensors may be incorporated into a laptop computer, a tablet PC, a smart phone, and a game console. Whether they stand alone or are incorporated into a computing device, the sensors are communicatively coupled to one or more network devices. An ad hoc spatial configuration means that the devices in the network are not initially aware of their location within the performance space.

Initially, devices within the performance area, or with a view of the performance area, are indentified. Once identified, the sensors go through a discovery phase to locate devices within an area. Once the discovery phase is complete and the devices within the ad hoc network are located, the combined signals received from the devices may be used to interpret gestures made within the performance area.

In one embodiment, multiple devices are used to interpret a gesture made while not facing any of the sensors. In this case, the multiple signals may be woven together to project the gesture onto a virtual viewpoint that provides an analytical component with features or attributes of the gesture that allow it to be identified. For example, the analytical component may integrate and project the signals on a plane oriented in a manner that makes the gesture ideally interpretable. Such projections from multiple devices can be useful in regularizing or normalizing the signals associated with the gesture in a manner conforming to the expectations of a pattern recognition process (e.g., the training and testing of a statistical classifier for gesture recognition).

Sensory data from inertial sensors may be combined with other sensor data to interpret a gesture. The inertial sensors can help to disambiguate some properties that may be difficult to fully sense via external (environmental) sensors only, such as the direction a device is facing, its precise orientation relative to gravity, etc. Using data from multiple sensors frees people from needing to face a particular direction when making a gesture. In this way, people can interact naturally within a performance environment without having to face a particular sensor.

In an embodiment, the devices output a signal that identifies the device to other sensors. The signal is interpreted to directly determine the device's position. In one embodiment, the signals are imperceptible to humans. For example, the signals may be sounds outside of human hearing range or light signals outside the visible spectrum. In other embodiments, the signals may be low-power radio emissions that afford calculation of distance between a sensor/emitter pair, as well as encode the identity (e.g. GUID) of the emitter. Multiple such distance estimates from multiple sensors on one or multiple devices may be used to triangulate spatial positions of the transmitter(s). The low-power radio emissions can be used to approximate distance between devices using instrumentation that is solely situated on the mobile devices. As such, they can enable a portable positioning system for sensing the relative spatial positions between a number of interoperating devices. Such sensors may also be used to help bootstrap more sophisticated (e.g. camera or depth-camera based approaches) which nonetheless may have difficulty identifying specific devices to start.

In another embodiment, additional sensing devices are pursued incrementally when recognition problems are noted on a primary device or with a set of devices already being used to recognize gestures. For example, a primary device or current configuration can perform an analysis that reveals that the information available in a situation is insufficient to recognize the performance of one or more potential gestures. Similarly, the primary device or current configuration may determine that it is unable to differentiate between similar known gestures (or intention associated with a gesture) with sufficient confidence. Such an assessment of insufficiency can be employed to guide the acquisition of additional sensors. As an example, if the feed from a camera cannot be used to discriminate whether person A or person B is making a gesture with their hands and legs in a gaming setting, given a current end-on view of two people playing the game, then the system may seek access to accelerometers on the smart phones on one or both of the players via a WI-FI or Bluetooth connection. The primary device or configuration may use the accelerometer signal to augment its reasoning and raise the confidence of which of the two players is making the gesture.

Beyond heuristically extending the numbers of devices, to gain access to sensors that may be available via a network, a system can be designed to engage in an detailed analysis of the value information provided by additional sensors from other available devices would be to the ad hoc sensor network. Such an analysis of information value can direct the extension of the ad hoc network in a specific manner, e.g., to complete a view, by filling in the most valuable pieces of the deficiencies in the current ad hoc sensing network.

Once the discovery phase is complete and the devices within the ad hoc network are located, the combined signals received from the devices may be used to interpret gestures made within the performance area. For example, trained or untrained gestures made by a person may be received. In one embodiment, multiple devices are used to interpret a gesture made while not facing any of the sensors. In this case, the multiple signals are woven together to project the gesture onto a front facing plane. In another embodiment, the best signal available is used to interpret the gesture. In this way, people can interact naturally within a performance environment without having to face a particular sensor.

In one aspect, a method of identifying gestures using a multidevice network with an ad hoc spatial configuration, wherein one or more devices in the multidevice network do not possess complete location information for other devices in the multidevice network is provided. The method comprises receiving a first sensory input generated by a first set of one or more sensors associated with a first device, the first sensory input describing a first view of a performance area. The method also comprises receiving a second sensory input generated by a second set of one or more sensors associated with a second device. The second sensory input describing a second view of the performance area that differs from the first view. The method also comprises identifying an object within the performance area that appears in both the first view and the second view. The method also comprises calculating a location of the first device relative to the second device by comparing the first device's distance from the object and the first device's orientation to the object with the second device's distance to the object and the second device's orientation to the object.

In another aspect, a method of identifying objects in a performance area using a multidevice network with an ad hoc spatial configuration is provided. The method comprises determining bounds of a performance area and identifying devices that can provide information about the performance area using at least visual sensory data (i.e., generated by a camera, video camera, depth camera, etc.). The method also comprises initiating communications between the devices to build an ad hoc network and determining the device's individual location within the performance area using sensory data generated by the sensors.

In another aspect, a method of recognizing a person using a multidevice network with an ad hoc spatial configuration is provided. The method comprises identifying devices with an ability to provide sensor data describing a performance area. A location of one or more of the devices is initially unknown. The method also comprises determining each of the device's individual location within the performance area using sensory data generated by the devices. The method also comprises identifying a person within the performance area that appears in both a first view generated by a first device and a second view generated by a second device. The first device and the second device are two of the devices.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices. The computer-storage media may be non-transitory.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Figure 2:
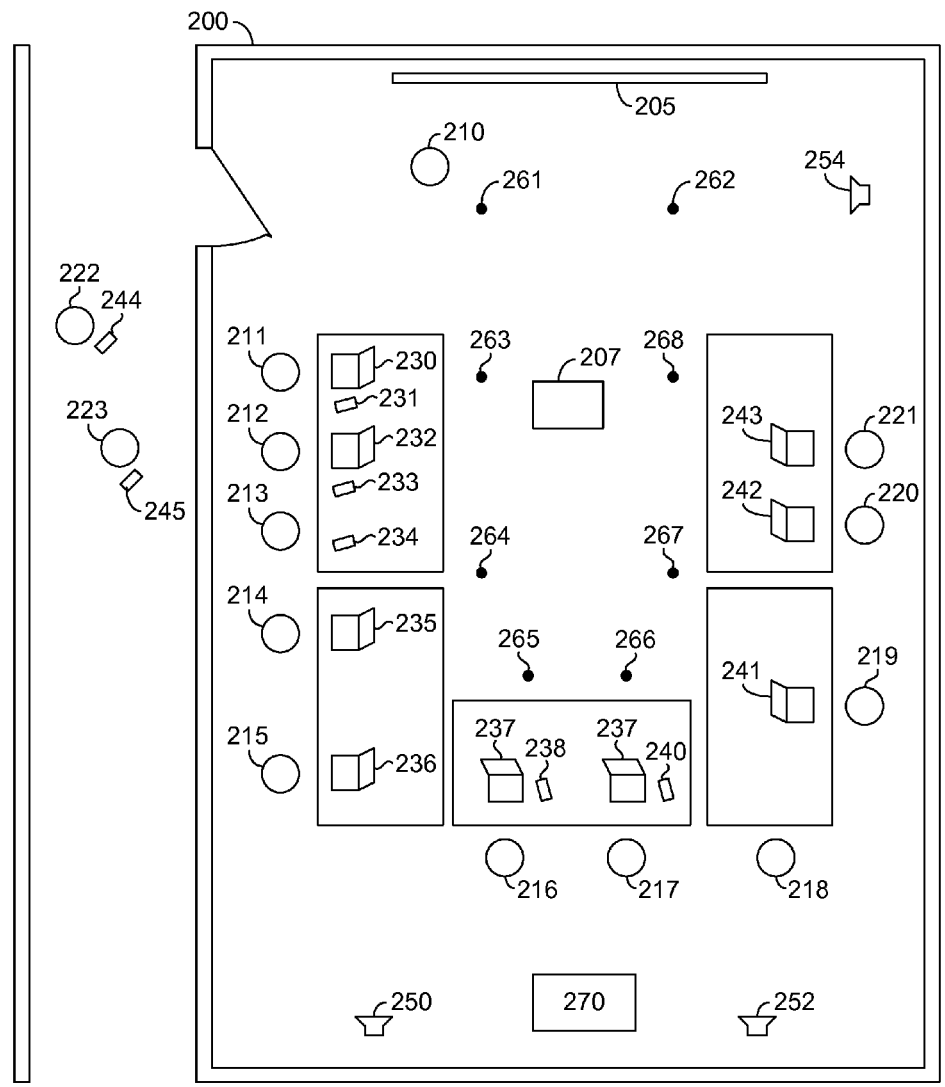
FIG. 2 is a diagram of computing devices within a performance area, in accordance with an embodiment of the present invention.

FIG. 2 shows an exemplary performance area 200 with objects and devices that can be used to form an ad hoc network, in accordance with an embodiment of the present invention. Performance area 200 is the interior of a conference room. The conference room 200 includes a primary display 205. In one embodiment, the primary display 205 is a flat screen TV or other self-contained display apparatus. In another embodiment, the primary display 205 is a screen for displaying images from projector 207. There are a number of people within the room. The presenter 210 is at the front of the room giving a presentation. Audience members include persons 211, 212, 213, 214, 215, 216, 217, 218, 219, 220, and 221. Passers-by 222 and 223 are located outside of the performance area. The passers-by 222 and 223 are both carrying phone 244 and 245 respectively.

One aspect of the invention is determining whether devices from which signals are received should be included in the ad hoc network. For example, devices in an ad hoc network may pick up radio signals (e.g., WI-FI) emitted by devices 244 and 245. In this case, devices 244 and 245 should be excluded because they do not have sensors that perceive the performance area 200. A device's location outside of the room may be determined by locating the walls of the room and determining the devices are located on the other side of the wall. Low-power radio signals can also help make this determination, as such signals may be blocked or significantly attenuated by walls/glass/intervening persons or other objects. Such technical attenuation can be helpful to make what the technology senses correspond better to the social space that the user perceives and in which the user operates.

The performance area 200 also includes multiple computing devices. The computing devices include laptop 230, Smartphone 231, laptop 232, Smartphone 233, Smartphone 234, laptop 235, laptop 236, laptop 237, Smartphone 238, laptop 237, Smartphone 240, laptop 241, laptop 242, and laptop 243. For the sake of simplicity only laptops and Smartphones were used in this example. Slates/tablets/e-readers and other devices could also be included. Each of these devices may be associated with a person nearby. For example, person 211 is presumptively associated with laptop 230 and Smartphone 231. In some cases, individual people in the room are identified through their devices even though their associated devices may not otherwise participate in gesture interpretation or other ad hoc network functions. For example, a computer could send a message to a device known to be associated with a person, such as a Smartphone, causing it to ring once. The network can notice the ring and associate a nearby person with the person known to be associated with the phone.

In another embodiment, a text message or other signal, such as an auditory cue, could be sent asking a recipient to pick up the phone, wave, or make some other observable gesture. These signals may be picked up by devices in the room and then the object within the sensory data can be associated with the particular person. This process could repeat multiple times until people and their associated devices are located in the performance area 200. In some embodiments, such associations may be determined automatically by correlating inertial sensing movements with movements by environmentally-situated sensors. The two methods may also be used in combination, e.g. with one as a fallback for the other.

In some embodiments of the present invention, computing devices are associated with the person for the sake of passing floor control. Floor control in a conference setting, or game setting, gives the person certain privileges not enjoyed by those without floor control. For example, floor control allows the person to use their computing devices to change content on the primary display 205 or other displays in the network. In one embodiment, multiple people may share floor control simultaneously. The person with floor control may be able to control one or more interfaces with gestures. As we'll discuss in more detail subsequently, floor control may be controlled by interpreting gestures that indicate which person presently has floor control.

The performance area 200 also includes a series of room microphones. The room microphones include mikes 261, 262, 263, 264, 265, 266, 267, and 268. The performance area also includes cameras 250, 252, and 254. In one embodiment, these cameras are depth cameras. The cameras may be portable. For example, the cameras may be moved into the room for a particular presentation and, thus, their exact location may not be known. In another embodiment, one or more of the cameras are fixed in the room and not portable.

The performance area 200 also includes control center 270. The control center 270 may serve as a central control for the ad hoc network. The control center 270 may, for example, be communicatively coupled to the room mikes and cameras 250, 252, and 254. A central control for the ad hoc network is not required in all embodiments to the present invention. For example, a distributed peer-to-peer network may be used.

Figure 3:
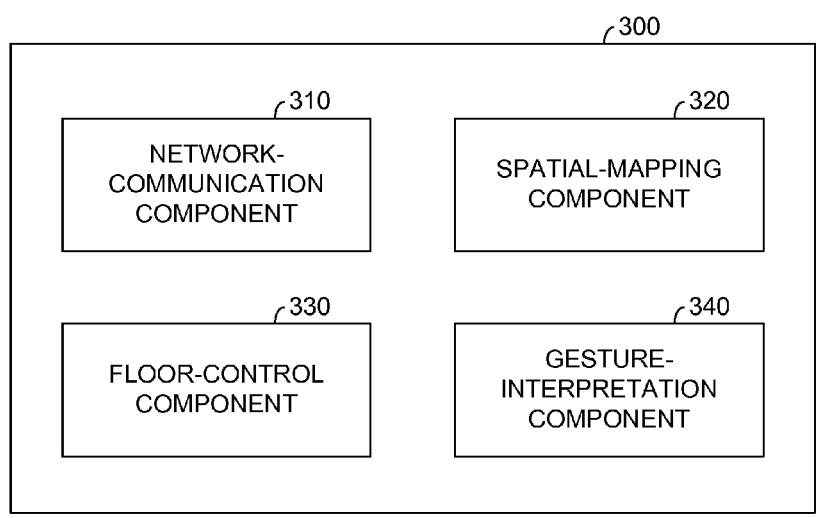
FIG. 3 is a diagram of a computing system architecture suitable for generating topical query suggestions, in accordance with an embodiment of the present invention.

Turning now to FIG. 3, an exemplary computing architecture 300 in which an ad hoc sensor network may be configured and utilized to interpret gestures is shown, in accordance with an embodiment of the present invention. The computing system architecture 300 is an example of one suitable computing system architecture 300. The computing system architecture 300 comprises on one or more computing devices similar to the computing device 100 described with reference to FIG. 1 or those in FIG. 2. The computing system architecture 300 should not be interpreted as having any dependency or requirement related to any single module/component or combination of modules/components illustrated therein.

The exemplary computing architecture 300 includes the network-communication component 310, the spatial-mapping component 320, the floor-control component 330, and the gesture-interpretation component 340. The exemplary computing architecture 300 may be distributed through a series of computing devices such as those shown in FIG. 2. In another embodiment, the components shown in exemplary computing architecture 300 all reside in a central computing device such as controller 270 shown in FIG. 2. Either way, the various components may interact with multiple sensors and/or computing devices within the ad hoc network.

The communications between computing devices and sensors is facilitated by the network-communication component 310. The network-communication component 310 may facilitate wireless or wired communications between computing devices. The network-communication component 310 may pass communications to other components as needed.

The network-communication component 310 may push one or more applications to computing devices within the ad hoc network. The applications facilitate communications between network devices, including the communication of sensor data. The applications may give the network-communication component 310 access to data from sensors on the computing device. The application may provide user interfaces though which information can be provided to the network. The network-communication component 310 may also interface with various stand-alone sensors. Stand-alone sensors are not integrated into a multipurpose computing device. Stand-alone devices, such as cameras, may have integrated processors and the ability to process sensor data.

The spatial-mapping component 320 is responsible for locating computing devices and/or sensors within the ad hoc network. As mentioned, locations, positions, distances, and angular separations between devices in the network may be unknown initially. Before device locations are determined, the spatial-mapping component 320 may establish the bounds of the performance area. For example, the interior of a room may form a performance area. In another embodiment, a subset or partition within a room may form a performance area. For example, an area near the front of the room may be designated as a main performance area while the audience in the room is outside of the performance area or in an auxiliary performance area. An area may be divided into multiple performance areas each associated with different privileges. The privileges may relate to changing or interacting with a presentation that is ongoing. A presentation may be a game, video, slide deck, or any other medium through which information is communicated. For example, objects within a primary performance area may have full control of the display. People in auxiliary areas may have limited control of the display.

In some embodiments, one physical performance area (e.g. a conference room) may be subdivided into multiple "social performance areas" based on the physical clustering and relative body orientation of a number of users. Such clusters, known as F-formations, occur naturally in groups of people and take on a number of characteristic shapes (e.g. face-to-face, side-by-size, L-shaped, or small rings of typically 2-5 persons). Such formations may be sensed by environmental sensors and used to derive notions of floor control, sharing permissions and discoverability, and so forth both within and between small social groups. For example, by default, a specific file or object offered for sharing may be exposed only to the small co-located social group by default, with additional (or different) gestures required to offer the object to a larger group or an entire room.

In one embodiment, an interface is presented through which one or more performance areas are established by the user. The interface may present an image of an area generated by data gathered by one or more sensors in the network. The user may then delineate portions of the area through the interface. For example, the user may draw a box on the representation to mark a first performance area. The interface then allows the user to assign privileges to people in the first performance area. Even though described as a performance area, certain areas of a room may be designated with no permissions. For example, an area around a refreshment table may be designated as a performance area in which all gestures and other user inputs should be ignored.

Once the performance area is defined, device locations are determined. In one embodiment, the spatial-mapping component 320 uses a multi-modal method of locating devices. Multi-modal means two or more types of signals are combined to locate devices. For example, a visual signal from a depth camera and an audio signal generated by a microphone may be combined to determine a device's location. As mentioned previously, the ad hoc network includes one or more devices without a known location relative to other devices or in absolute terms within a performance area. For example, when a person carries a laptop into a conference room, the laptop may become part of the ad hoc network, but its location is not known initially. There are multiple ways for the spatial-mapping component 320 to locate devices (or other objects) within a performance area. Further, it should be noted that the network is also ad hoc in the sense that devices that end up in the network may be initially unknown to each other.

In one embodiment, the sensors, or devices associated with the sensors that are being located, output signals that are detected by other sensors in the network. For example, sensors could emit sounds, light, radio signals, or movements that are detected by other sensors. In some cases, these signals may be analyzed to obtain an approximate location of the sensor. In one embodiment, the signals emitted are not perceptible to people in the room to prevent unnecessary distraction. For example, the signals can utilize sounds outside of human audio range or light outside of the visible spectrum. And broadly speaking, signals across the whole electromagnetic spectrum may be useful here: combinations of multiple low-power radio frequencies, for example.

In another embodiment, the signals from multiple sensors are analyzed to identify one or more objects that are common to multiple sensors. For example, a person standing at the front of the room may be in the sensor data perceived from two or more sensors in the ad hoc network. The person may be identified as the same object by comparing colors, size, texture, shape, movements detected via inertial sensors, and other features observed within the data. When these various characteristics have above a threshold of similarity, it is determined that the different sensors are perceiving the same object. Once a common object is determined, the network uses the distance and orientation from the object to locate the sensors.

Identifying multiple objects perceived by the same group of sensors can help further calibrate the location data. Similarly, when an object moves around, as when the object is a person, the location of the sensors can be further calibrated. In this way, the sensors can become more accurately located as additional data is received. In one embodiment, the discovery of the locations occurs as the performance occurs without a particular location step being perceived by users or people within their performance area.

The floor-control component 330 receives sensor data and looks for gestures and other information within the data. The gestures may be trained gestures that are associated with a particular computing response. For example, a wave of the hand in a certain manner may advance slides in a slide deck. Other gestures may be untrained. Untrained gestures may be thought of as naturally occurring body language observed in people. For example, floor control may be given to a person who stands up to speak. In this case, two different sets of sensor data could be used to understand this gesture. On the one hand, visual data can observe the person standing and auditory data can perceive the person speaking. Furthermore, in the case of multiple standing people, detecting an individual making frequent larger-scale hand movements typical of hand gestures while speaking (and combined with spatial audio detection) may enhance proper detection of floor control.

A person with floor control may be granted control of a primary display. Further, the ad hoc network may focus additional analysis on the person with floor control to detect the performance of intentional gestures. In one embodiment, the person with floor control is the only person who is able to control the primary display via gestures.

The floor control-component 330 may identify particular gestures that indicate floor control is changed. For example, a person with current floor control may point at a person in the room and that can be interpreted as a gesture to give the person to whom they are pointing floor control. The floor-control component 330 may receive gesture information form the gesture-interpretation component 340.

The gesture-interpretation component 340 looks for and interprets gestures. Gestures have been mentioned previously, the gestures may be made by a person with floor control or by anyone else within a performance area. In one embodiment, the gesture-interpretation component 340 interprets gestures that are made while not facing any particular sensor device within the ad hoc sensor network. For example, the gesture may be made at a 30° angle to a first sensor and a 45° angle to a second sensor. Generally, these angles are not ideal for interpreting a gesture. Embodiments of the present invention weave the sensory data from the different sensors together to get a better understanding or view of the gesture. In one embodiment, the data is woven together to project the gesture onto a plane as if the gesture were made facing the plane. The projection is then interpreted.

Gesture recognition systems may have been trained with sensors and views aligned in a particular manner, and operate best for real-time detection from such a "normalized" view. Embodiments include methods that work to fill in missing portions of views by considering desired three-dimensional sensing volumes or four-dimensional sensing volumes. The four-dimensional sensing volumes comprise volumes over time. Methods may fill in missing portions by projecting available portions of the sensing volumes, or subspaces, onto desired planes that are consistent with the "normalized" view. Each device and its available sensors provide some aspect of the target geometry. Deficiencies or "holes" in sensing that need to be extended or filled to generate a usable target virtual geometry can be computed and represented explicitly using the projections. In addition, holes can be filed by seeking out new sensors on the network that have a better view of the desired geometry. When a "hole" is identified, a supplemental discovery phase may be conducted to look for new sensors that can help provide data to fill the hole. In the alternative, the devices may have previously been discovered, but can now be asked to provide information needed to fill the hole. In this way, the target viewpoint geometries can be constructed to minimize sensing blind spots or other deficiencies using the projections and by finding new sensors.

Figure 4:
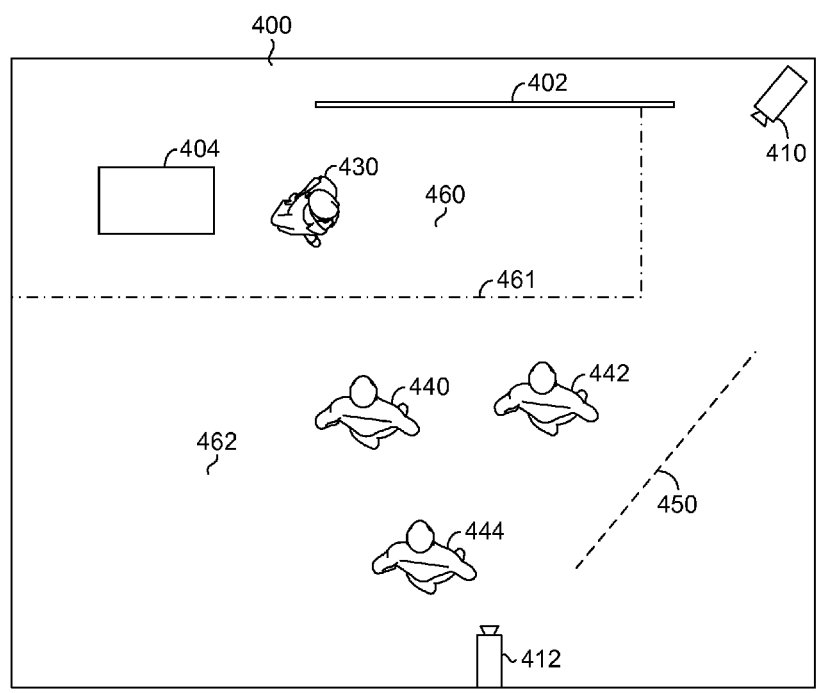
FIG. 4 is a diagram of a room with multiple performance areas, in accordance with an embodiment of the present invention.

Turning now to FIG. 4, an exemplary performance area 400 is shown, according to aspects of the present invention. The performance area 400 includes a main display 402, a controller 404, a first sensing unit 410, and a second sensing unit 412. The first sensing unit 410 may be a depth camera coupled to a microphone array or other sensors. Alternatively, the first sensing unit 410 could be a single sensor. The second sensing unit 412 may be similar to the first sensing unit 410. Initially, the sensing units 410 and 412 may utilize one or more objects in the room to locate themselves within the room. This process may be driven by controller 404. The objects in the room include people 430, 440, 442, and 444. In this case, person 430 is a presenter. People 440, 442, and 444 form part of the audience.

The performance area 400 is segregated into two areas. The primary performance area 460 (delineated by line 461) is near the front of the room. The second performance area (462) includes the audience on the other side of line 461.

The presenter is facing plane 450. Thus, any gestures made would be facing plane 450 and would not be facing sensing device 410, nor sensing device 412. As mentioned, interpreting gestures when they are not made facing a device can be difficult. For example, it may be difficult to tell how many fingers a person is holding up when the sensor is viewing a hand from the side, or nearly the side. Using sensory data from sensory units 410 and 412 can improve gesture interpretation by combined signals to interpret the gesture.

The combined signals received from the sensory units 410 and 412 may be used to interpret gestures made within the performance area 400. The multiple signals may be woven together to project the gesture onto a virtual viewpoint that provides controller 404 with features or attributes of the gesture that allow it to be identified. For example, the controller 404 may integrate and project the signals on a plane oriented in a manner that makes the gesture ideally interpretable. Such projections from multiple devices can be useful in regularizing or normalizing the signals associated with the gesture in a manner conforming to the expectations of a pattern recognition process (e.g., the training and testing of a statistical classifier for gesture recognition). In another embodiment, the best signal available is used to interpret the gesture. In this way, people can interact naturally within a performance environment without having to face a particular sensor.

In response to the gesture, changes could be made to primary display 402, or other actions could be taken. As mentioned, gestures made by the audience members may be ignored in certain embodiments. In other embodiments, only certain audience gestures are recognized. For example, an audience member could raise their hand indicating a question and an icon or other indication could be added to the main display 402 to remind the presenter that an audience member has a question. In one embodiment, the person raising their hand could then submit a text or email or other communication that is received by the controller 404 and associated with the indication on the screen. The presenter 430 could then read the question or come back to the question later in the presentation.

Figure 5:
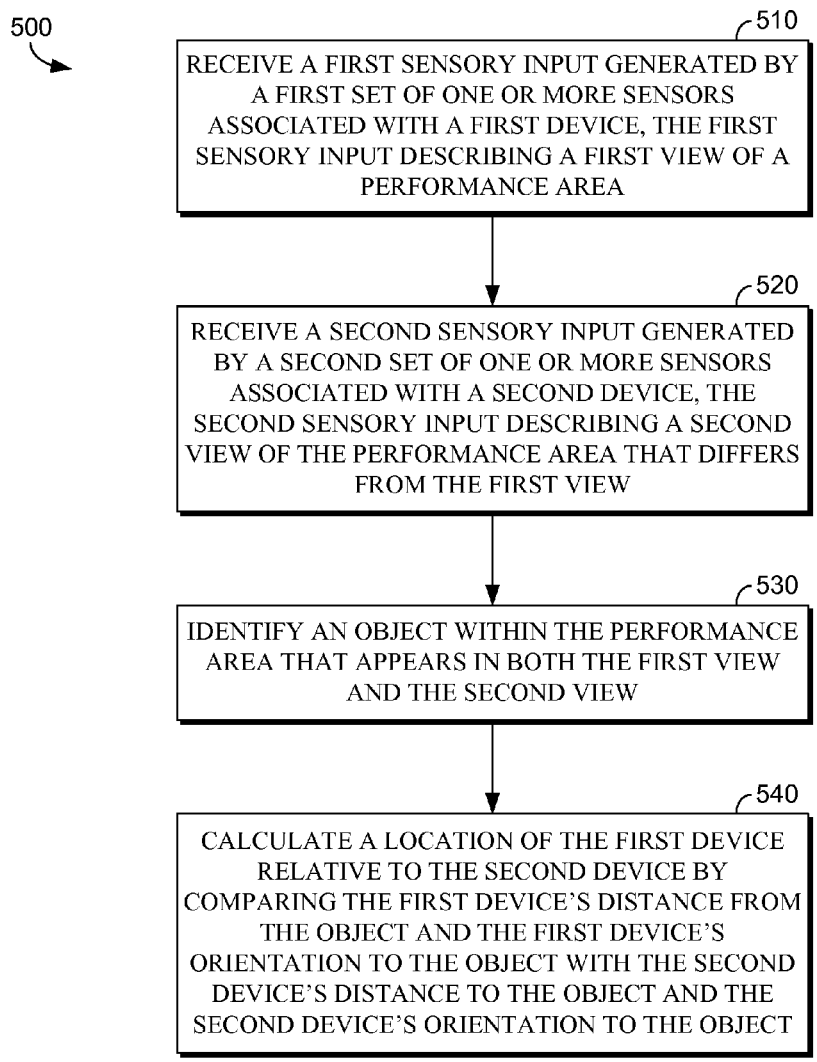
FIG. 5 is a flow chart showing identifying gestures using a multidevice network with an ad hoc spatial configuration, in accordance with an embodiment of the present invention.

Turning now to FIG. 5, a method 500 of identifying gestures using a multidevice network with an ad hoc spatial configuration is shown, in accordance with an embodiment of the present invention. The one or more devices in the multidevice network do not possess complete location information for other devices in the multidevice network. In other words, the collective intelligence of devices in the ad hoc network is to not know each device's relative or absolute location within the performance area. As mentioned before, the devices could be computing devices such as laptops, desktops, tablets, smart phones, display screens, projectors, and other devices. The devices may be stand-alone sensors such as cameras, microphones, and similar devices.

At step 510, a first sensory input generated by a first set of one or more sensors associated with a first device is received. The first sensory input describes a first view of a performance area. As mentioned, the performance area may be a room or part of a room or any bounded area. The input may be a data stream describing visual data, audio data, signal data, or other characteristics of the performance area. In one embodiment, the first sensory input is from a depth camera. As mentioned, a depth camera assigns a location to each pixel in addition to the colors assigned to each pixel by a regular camera.

At step 520, a second sensory input generated by a second set of one or more sensors associated with a second device is received. The second sensory input describes a second view of the performance area that differs from the first view. In one embodiment, the first view and the second view have different perspectives. In other words, the first and second devices are located in different parts of the performance area. The first and second devices may have been identified as part of an initial discovery process that occurred prior to steps 510 and 520. Available sensors with a view of a performance area are detected during a discovery process. Once detected, they may be communicatively coupled to form a sensor network. A supplemental discovery phase may be conducted at any time to find additional sensors that may be able to fill holes in the sensory volume.

At step 530, an object within the performance area that appears in both the first and the second view is identified. In one embodiment, the object is a person. The object may be identified based on characteristics such as color, size, shape, orientation, and texture.

At step 540, a location of the first device relative to the second device is calculated by comparing the first device's distance from the object and the first device's orientation to the object with the second device's distance to the object and the second device's orientation to the object. In another embodiment, multiple common items within the first and second view are identified and used to further calibrate the location. In this sense, the location calculated in step 540 may be thought of as a preliminary location.

In one embodiment, a skeletal geometry for the person is calculated and used to determine the orientation of the object and then the orientation of the first device and the second device to the person and eventually each other. As mentioned, once the devices are located, further sensory input may be received and used to determine that a gesture has been performed. Knowing the location of each device within the room allows the sensory data to be woven together to interpret the gesture.

Figure 6:
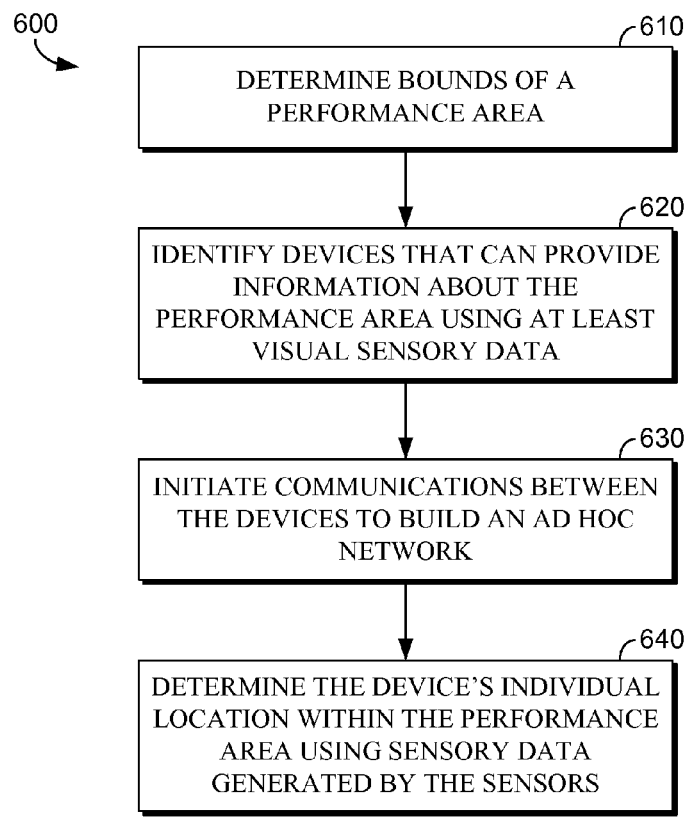
FIG. 6 is a flow chart showing identifying common objects using a multidevice network with an ad hoc spatial configuration, in accordance with an embodiment of the present invention.

Turning now to FIG. 6, a method 600 of identifying a common object using a multidevice network with an ad hoc spatial configuration is shown, in accordance with an embodiment of the present invention. At step 610, the bounds of a performance area are determined. As mentioned, a single room or other area may have multiple performance areas. At step 610, at least one of those performance areas is determined.

At step 620, sensors that could provide information about the performance area using at least visual sensory data are identified. Sensors may be cameras or depth cameras. In addition to visual sensory data, audio and signal data such as those generated by Wi-Fi connections, infrared, mobile telephone signals, and others may be identified.

At step 630, communications between the computing devices are initiated to build an ad hoc network. These communications may be performed by a component similar to the network-communication component 310 described previously with reference to FIG. 3. The communications form links through which signal data may be shared throughout the ad hoc network. Other instructions may also be sent via the communication links established at step 630.

At step 640, the computing device's individual location within the performance area is determined using sensory data generated by the computing devices. Once the location of the devices is determined, the sensor data may be used to receive instructions from people in the performance area via gestures.

The ad hoc network looks for and interprets gestures. Gestures have been mentioned previously, the gestures may be made by a person with floor control or by anyone else within a performance area. In one embodiment, the gesture-interpretation component 340 interprets gestures that are made while not facing any particular sensor device within the ad hoc sensor network. For example, the gesture may be made at a 30° angle to a first sensor and a 45° angle to a second sensor. Generally, these angles are not ideal for interpreting a gesture. Embodiments of the present invention weave the sensory data from the different sensors together to get a better understanding or view of the gesture. In one embodiment, the data is woven together to project the gesture onto a plane as if the gesture were made facing the plane. The projection is then interpreted.

Gesture recognition systems may have been trained with sensors and views aligned in a particular manner, and operate best for real-time detection from such a "normalized" view. Embodiments include methods that work to fill in missing portions of views by considering desired three-dimensional sensing volumes or four-dimensional sensing volumes. The four-dimensional sensing volumes comprise volumes over time. Methods may fill in missing portions by projecting available portions of the sensing volumes, or subspaces, onto desired planes that are consistent with the "normalized" view. Each device and its available sensors provide some aspect of the target geometry. Deficiencies or "holes" in sensing that need to be extended or filled to generate a usable target virtual geometry can be computed and represented explicitly using the projections. In addition, holes can be filed by seeking out new sensors on the network that have a better view of the desired geometry. When a "hole" is identified, a supplemental discovery phase may be conducted to look for new sensors that can help provide data to fill the hole. In the alternative, the devices may have previously been discovered, but can now be asked to provide information needed to fill the hole. In this way, the target viewpoint geometries can be constructed to minimize sensing blind spots or other deficiencies using the projections and by finding new sensors.

Figure 7:
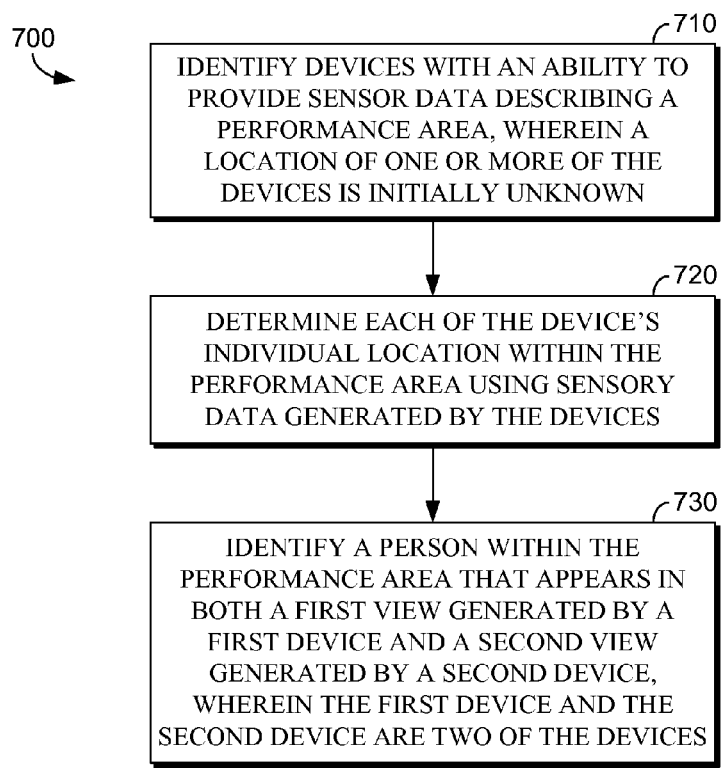
FIG. 7 is a flow chart showing identifying people using a multidevice network with an ad hoc spatial configuration, in accordance with an embodiment of the present invention.

Turning now to FIG. 7, a method 700 of identifying a person using a multidevice network with an ad hoc spatial configuration is shown, in accordance with an embodiment of the present invention. At step 710, computing devices within a performance area are identified using at least visual sensory data as part of an initial discovery phase. A location of one or more of the computing devices is initially unknown. At step 710, a computing device with access to visual data generated by a camera may look for devices such as laptop computers, smart phones, other cameras, and microphones that have a view of the performance area. In one embodiment, the computing devices may be outside of a performance area but, nevertheless, have a view of the performance area and can provide sensory data to describe objects within the performance area. A subsequent discovery phase may be conducted as gaps in the sensor data are detected, as sensor location or views change, as sensors are added and subtracted from an area, or in other circumstances. Once an initial ad hoc network of sensors is built, the potential value that additional sensor data might have to the accurate analysis of the performance area may be determined. Sensors providing valuable data may be added to the ad hoc network at any time.

At step 720, each of the computing device's location within the performance area is determined using sensory data generated by the computing devices. The sensory data may include visual, audio, and other signal data. At step 730, a person within the performance area that appears in both a first view generated by a first device and a second view generated by a second device is identified. The first device and the second device are two of the computing devices with a view of the performance area. Gestures performed by the person may be interpreted using data from the two or more computing devices.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage devices having computer-executable instructions embodied thereon that when executed by a computing device perform a method of identifying gestures using a multidevice network with an ad hoc spatial configuration, wherein one or more devices in the multidevice network do not possess complete location information for other devices in the multidevice network, the method comprising:

completing an initial discovery phase to identify a first device, a second device, and one or more additional devices with a view of the performance area and an ability to communicate sensory data describing the view;

receiving a first sensory input generated by a first set of one or more sensors associated with the will first device, the first sensory input describing a first view of a performance area;

receiving a second sensory input generated by a second set of one or more sensors associated with the second device, the second sensory input describing a second view of the performance area that differs from the first view;

identifying a person within the performance area that appears in both the first view and the second view;

calculating a location of the first device relative to the second device by comparing the first device's distance from the person and the first device's orientation to the person with the second device's distance to the person and the second device's orientation to the person;

determining that the person performed a gesture using sensory input from the first device and the second device, wherein the gesture is performed facing neither the first device nor the second device;

determining that the sensory input from the first device and the second device is inadequate to interpret the gesture; and conducting a supplemental discovery phase to heuristically add devices to the ad hoc network in order to gain access to sensors that are able to provide data that allows the gesture to be interpreted.

2. The device of claim 1, wherein the method further comprises projecting available portions of a sensory volume, which is derived from the sensory input from the first device and the second device, onto a desired plane that is consistent with a normalized view of the gesture.

3. The device of claim 1, wherein the person is moving and Previously Presented sensory input from the first device and the second device generated by the person changing location and orientation are used to calculate a refined location of the first device relative to the second device.

4. The device of claim 1, and wherein the method further comprises calculating a skeletal geometry for the person and using the skeletal geometry to determine orientation of the first device and the second device to the person.

5. The device of claim 1, wherein the method further comprises using the first sensory input and the second sensory input to identify social clusters of people within the performance area by analyzing people's relative locations and interactions with each other.

6. The device of claim 5, wherein the method further comprises, in response to the gesture, performing an action that only impacts people within a particular social cluster.

7. The device of claim 1, wherein the method further comprises communicating an instruction the person to perform a gesture that enables the person to be located using the first sensory input and the second sensory input.

8. The device of claim 1, wherein the method further comprises determining a value of information for sensory data generated by other sensors that are not part of the multidevice network and adding one or more sensors to the multidevice network based on the value of information.

9. The device of claim 1, wherein the method further comprises, in response to the gesture, without human intervention, changing control of at least one display within the performance area to the person from a different person.

10. A method of identifying gestures using a multidevice network with an ad hoc spatial configuration, wherein one or more devices in the multidevice network do not possess complete location information for other devices in the multidevice network, the method comprising:
    completing an initial discovery phase to identify a first device, a second device, and one or more additional devices with a view of the performance area and an ability to communicate sensory data describing the view;
    receiving a first sensory input generated by a first set of one or more sensors associated with the will first device, the first sensory input describing a first view of a performance area;
    receiving a second sensory input generated by a second set of one or more sensors associated with the second device, the second sensory input describing a second view of the performance area that differs from the first view;
    identifying a person within the performance area that appears in both the first view and the second view;
    calculating a location of the first device relative to the second device by comparing the first device's distance from the person and the first device's orientation to the person with the second device's distance to the person and the second device's orientation to the person;
    determining that the person performed a gesture using sensory input from the first device and the second device, wherein the gesture is performed facing neither the first device nor the second device;
    determining that the sensory input from the first device and the second device is inadequate to interpret the gesture; and
    conducting a supplemental discovery phase to heuristically add devices to the ad hoc network in order to gain access to sensors that are able to provide data that allows the gesture to be interpreted.

11. The method of claim 10, wherein the method further comprises projecting available portions of a sensory volume, which is derived from the sensory input from the first device and the second device, onto a desired plane that is consistent with a normalized view of the gesture.

12. The method of claim 10, wherein the person is moving and Previously Presented sensory input from the first device and the second device generated by the person changing location and orientation are used to calculate a refined location of the first device relative to the second device.

13. The method of claim 10, and wherein the method further comprises calculating a skeletal geometry for the person and using the skeletal geometry to determine orientation of the first device and the second device to the person.

14. The method of claim 10, wherein the method further comprises using the first sensory input and the second sensory input to identify social clusters of people within the performance area by analyzing people's relative locations and interactions with each other.

15. The method of claim 14, wherein the method further comprises, in response to the gesture, performing an action that only impacts people within a particular social cluster.

16. The method of claim 10, wherein the method further comprises communicating an instruction the person to perform a gesture that enables the person to be located using the first sensory input and the second sensory input.

17. The method of claim 10, wherein the method further comprises determining a value of information for sensory data generated by other sensors that are not part of the multidevice network and adding one or more sensors to the multidevice network based on the value of information.

18. The method of claim 10, wherein the method further comprises, in response to the gesture, without human intervention, changing control of at least one display within the performance area to the person from a different person.

* * * * *